United States Patent
Ye

(10) Patent No.: US 9,210,706 B2
(45) Date of Patent: Dec. 8, 2015

(54) MOBILE COMMUNICATION DEVICES AND METHODS FOR PHYSICAL DOWNLINK CONTROL CHANNEL (PDCCH) MONITORING

(71) Applicant: Acer Incorporated, New Taipei (TW)

(72) Inventor: Shiang-Rung Ye, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 196 days.

(21) Appl. No.: 14/020,457

(22) Filed: Sep. 6, 2013

(65) Prior Publication Data

US 2014/0092834 A1    Apr. 3, 2014

Related U.S. Application Data

(60) Provisional application No. 61/707,173, filed on Sep. 28, 2012.

(51) Int. Cl.
*H04W 4/00* (2009.01)
*H04W 72/04* (2009.01)

(52) U.S. Cl.
CPC .......... *H04W 72/0446* (2013.01); *H04W 72/04* (2013.01)

(58) Field of Classification Search
None
See application file for complete search history.

(56) References Cited

U.S. PATENT DOCUMENTS

| | | | |
|---|---|---|---|
| 2009/0289524 A1 | 11/2009 | Rossetto | |
| 2009/0298524 A1* | 12/2009 | Kuo | 455/509 |
| 2010/0074231 A1* | 3/2010 | Hsu | 370/336 |
| 2010/0195605 A1* | 8/2010 | Suzuki et al. | 370/329 |
| 2011/0107169 A1* | 5/2011 | Lohr et al. | 714/748 |
| 2011/0170500 A1* | 7/2011 | Kuo et al. | 370/329 |
| 2012/0113831 A1* | 5/2012 | Pelletier et al. | 370/252 |
| 2012/0178445 A1* | 7/2012 | Dalsgaard et al. | 455/434 |
| 2012/0281566 A1* | 11/2012 | Pelletier et al. | 370/252 |
| 2013/0223300 A1* | 8/2013 | Yang et al. | 370/280 |
| 2014/0198748 A1* | 7/2014 | Lee et al. | 370/329 |
| 2014/0247763 A1* | 9/2014 | Suzuki et al. | 370/311 |
| 2015/0043490 A1* | 2/2015 | Wu | 370/329 |
| 2015/0092647 A1* | 4/2015 | Tabet et al. | 370/311 |

FOREIGN PATENT DOCUMENTS

EP    2166804 A1    3/2010

OTHER PUBLICATIONS

EP Search Report dated Feb. 6, 2014 in corresponding EP Application (No. 13186132.0-1854).

(Continued)

*Primary Examiner* — Otis L Thompson, Jr.
(74) *Attorney, Agent, or Firm* — McClure, Qualey & Rodack, LLP

(57) ABSTRACT

A mobile communication device having a Semi-Persistent Scheduling (SPS) Cell Radio Network Temporary Identifier (C-RNTI) is provided. In the mobile communication device, a wireless module performs wireless transmission and reception to and from a cellular station, and a controller module performs operations for communication controls. The operations include: determining whether SPS has been enabled for downlink (DL), and instructing the wireless module to monitor a Physical Downlink Control Channel (PDCCH) for a DL assignment reception from the cellular station for a Transmission Time Interval (TTI), in response to the mobile communication device having the SPS C-RNTI and SPS having been enabled for DL.

16 Claims, 4 Drawing Sheets

(56) References Cited

OTHER PUBLICATIONS

TW Office Action dated Jun. 26, 2015 in corresponding TW application (No. 102134950).
"3rd Generation Partnership Project; Technical Specification Group Radio Access Network; Evolved Universal Terrestrial Radio Access (E-UTRA) Medium Access Control (MAC) Protocol Specification"; Release 8; 3GPP TS 36.321 V8.2.0 (May 2008); pp. 1-31.
"3rd Generation Partnership Project; Technical Specification Group Radio Access Network; Evolved Universal Terrestrial Radio Access (E-UTRA) Medium Access Control (MAC) Protocol Specification"; Release 11; 3GPP TS 36.321 V11.0.0 (Sep. 2012); pp. 1-55.
Clarification on PDCCH monitoring R2-124866 (Sep. 28, 2012).
Clarification on PDCCH monitoring R2-124871 (Sep. 28, 2012).
Clarification on PDCCH monitoring R2-124865 (Sep. 28, 2012).
Clarification on PDCCH monitoring R2-124870 (Sep. 28, 2012).

* cited by examiner

MOBILE COMMUNICATION DEVICES AND METHODS FOR PHYSICAL DOWNLINK CONTROL CHANNEL (PDCCH) MONITORING

CROSS REFERENCE TO RELATED APPLICATION

This Application claims priority of U.S. Provisional Application No. 61/707,173, filed on Sep. 28, 2012, and the entirety of which is incorporated by reference herein.

BACKGROUND OF THE INVENTION

1. Field of the Invention

The invention generally relates to Physical Downlink Control Channel (PDCCH) monitoring, and more particularly, to PDCCH monitoring for a downlink assignment reception and an uplink grant reception when the User Equipment (UE) has a Semi-Persistent Scheduling (SPS) Cell Radio Network Temporary Identifier (C-RNTI).

2. Description of the Related Art

With growing demand for ubiquitous computing and networking, various wireless technologies have been developed, such as the Wireless Local Area Network (WLAN) technologies, including the Wireless Fidelity (WiFi) technology, Bluetooth technology, and the ZigBee technology, etc., as well as cellular technologies including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced technology, etc.

Taking the LTE technology as an example, a feature called Semi-Persistent Scheduling (SPS) has been proposed to reduce control channel overhead for applications that require persistent radio resource allocations such as Voice over Internet Protocol (VoIP). For the LTE technology, both downlink (DL) and uplink (UL) are fully scheduled since the DL and UL traffic channels are dynamically shared channels. This means that the PDCCH must provide access grant information to indicate which user device(s) should decode the Physical Downlink Shared Channel (PDSCH) in each subframe and to indicate which user device(s) is(are) allowed to transmit on the Physical Uplink Shared Channel (PUSCH) in each subframe. Without SPS, every DL or UL Physical Resource Block (PRB) allocation must be granted via an access grant message on the PDCCH. This is sufficient for most bursty best-effort types of applications which generally have large packet sizes and thus typically only a few users must be scheduled in each subframe. However, for applications that require persistent allocations of small packets (e.g. VoIP), the access grant control channel overhead can be greatly reduced with SPS.

BRIEF SUMMARY OF THE INVENTION

In a first aspect of the invention, a mobile communication device having an SPS C-RNTI is provided. The mobile communication device comprises a wireless module and a controller module. The wireless module performs wireless transmission and reception to and from a cellular station. The controller module performs operations for communication controls, wherein the operations comprise: determining whether SPS has been enabled for DL, and instructing the wireless module to monitor a PDCCH for a DL assignment reception from the cellular station for a Transmission Time Interval (TTI), in response to the mobile communication device having the SPS C-RNTI and SPS having been enabled for DL.

In a second aspect of the invention, a method for monitoring a PDCCH by a mobile communication device having an SPS C-RNTI configured by a cellular station is provided. The method comprises the steps of: determining whether SPS has been enabled for DL; and monitoring the PDCCH for a DL assignment reception from the cellular station for a TTI, in response to the mobile communication device having the SPS C-RNTI and SPS having been enabled for DL.

In a third aspect of the invention, a mobile communication device having an SPS C-RNTI is provided. The mobile communication device comprises a wireless module and a controller module. The wireless module performs wireless transmission and reception to and from a cellular station. The controller module performs operations for communication controls, wherein the operations comprise: determining whether SPS has been enabled for UL, and instructing the wireless module to monitor a PDCCH for an UL grant reception from the cellular station for a TTI, in response to the mobile communication device having the SPS C-RNTI and SPS having been enabled for UL.

In a fourth aspect of the invention, a method for monitoring a PDCCH by a mobile communication device having an SPS C-RNTI configured by a cellular station is provided. The method comprises the steps of: determining whether SPS has been enabled for UL; and monitoring the PDCCH for an UL grant reception from the cellular station for a TTI, in response to the mobile communication device having the SPS C-RNTI and SPS having been enabled for UL.

Other aspects and features of the present invention will become apparent to those with ordinarily skill in the art upon review of the following descriptions of specific embodiments of the mobile communication devices and the methods for monitoring the PDCCH.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. It should be understood that the embodiments may be realized in software, hardware, firmware, or any combination thereof.

It is noted that, according to the 3rd Generation Partnership Project (3GPP) Technical Specification (TS) 36.321 v10.0.0, a UE having a Semi-Persistent Scheduling Cell Radio Network Temporary Identifier (referred to herein as SPS C-RNTI for brevity) should always monitor the PDCCH for a DL assignment reception for a TTI. However, there may be a situation where the cellular station configures SPS with the UE for UL only. Similarly, according to the 3GGP TS 36.321 v10.0.0, a UE having an SPS C-RNTI should always monitor the PDCCH for an UL grant reception for a TTI. However, there may be a situation where the cellular station configures SPS with the UE for DL only. As a result, the PDCCH monitoring for the non-configured UL or DL may cause unnecessary power consumption.

In order to solve the aforementioned problems, the invention proposes solutions for a UE to avoid unnecessary PDCCH monitoring when it is configured with an SPS C-RNTI.

Figure 1:
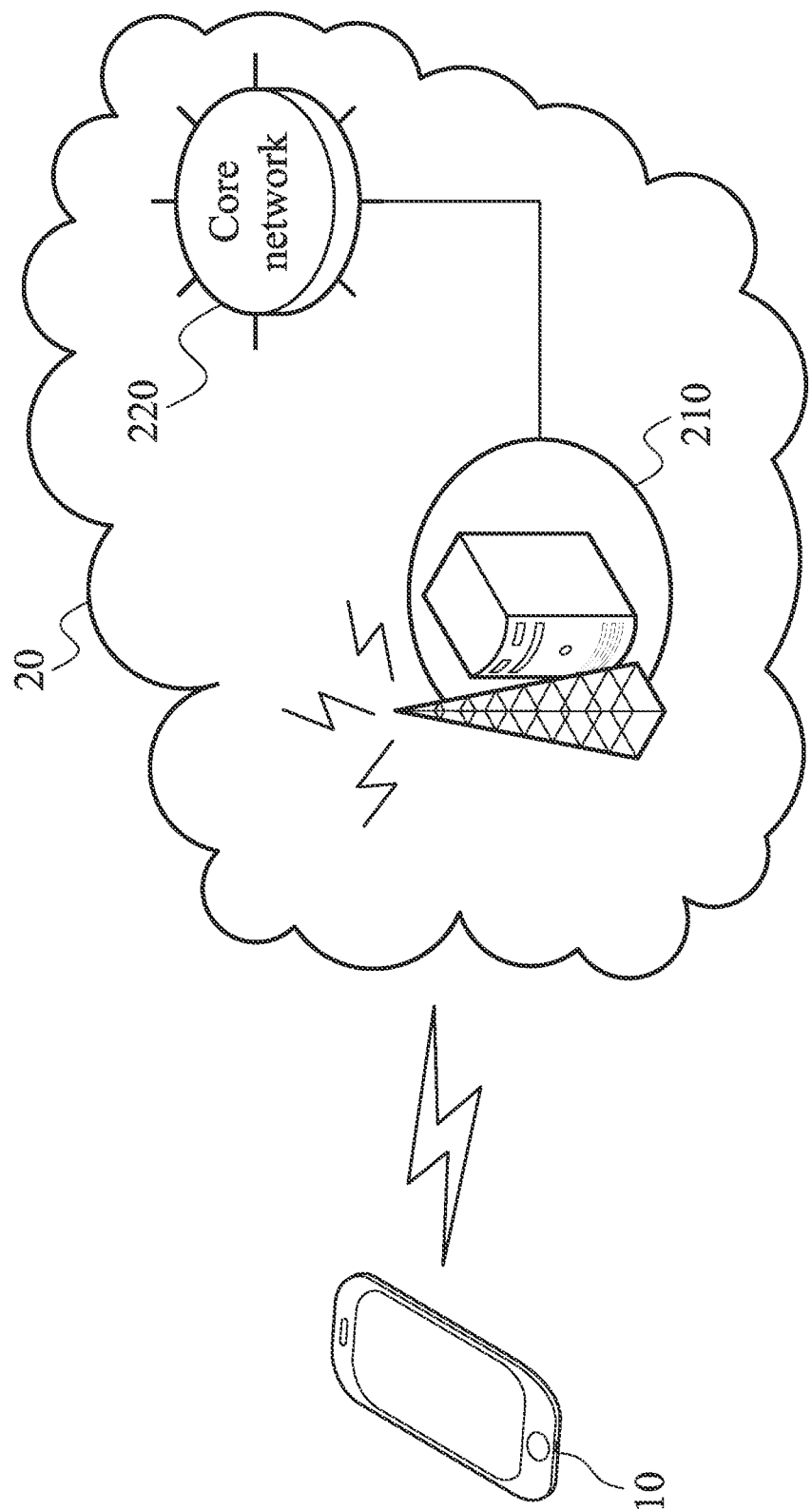
FIG. 1 is a block diagram illustrating a mobile communication environment according to an embodiment of the invention.

FIG. 1 is a block diagram illustrating a mobile communication environment according to an embodiment of the invention. In the mobile communication environment, the mobile communication device 10 wirelessly communicates with the service network 20 via an air interface. The mobile communication device 10 may be a smart phone, a panel Personal Computer (PC), a laptop computer, or any computing device supporting at least the wireless technology utilized by the service network 20. The service network 20 comprises a cellular access network 210 and a core network 220, wherein the cellular access network 210 is responsible for processing radio signals, terminating radio protocols, and connecting the mobile communication device 10 with the core network 220. The cellular access network 210 may comprise one or more cellular stations, such as base stations, Node-Bs, or evolved Node-B (eNB), depending on the wireless technology in use. The core network 220 is responsible for performing mobility management and network-side authentication. Although not shown, the core network 220 may further enable interfacing with external networks, such as the Public Switched Telephone Network (PSTN), which is called the Circuit Switched (CS) domain functionality, and/or interfacing with the Internet Protocol (IP) based Network, such as the Internet, which is called the Packet Switched (PS) domain functionality.

In one embodiment, the service network 20 may be an LTE network, the cellular access network 210 may be an Evolved Universal Terrestrial Radio Access Network (E-UTRAN) which comprises at least one eNB, and the core network 220 may be an Evolved Packet Core (EPC) which includes a Home Subscriber Server (HSS), Mobility Management Entity (MME), Serving Gateway (S-GW), and Packet Data Network Gateway (PDN-GW or P-GW). Please note that, in another embodiment, a different wireless technology, such as the LTE-Advanced technology or any future evolution of the LTE technology family, may be utilized by the service network 20 and the mobile communication device 10, and the invention is not limited thereto.

Figure 2:
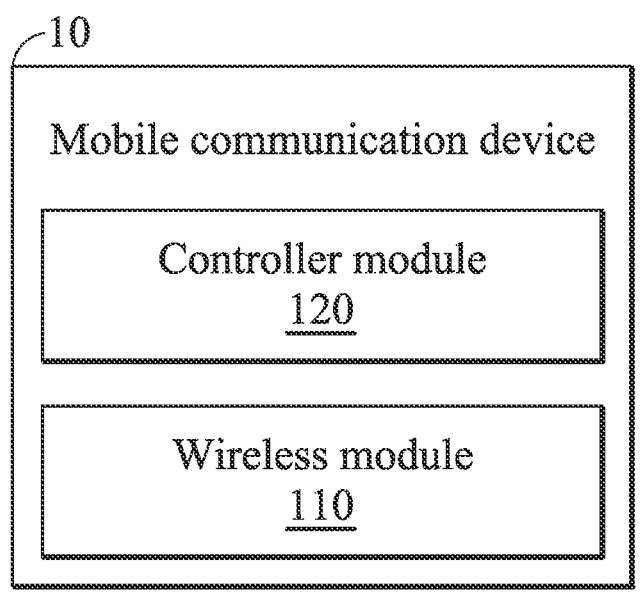
FIG. 2 is a block diagram illustrating the mobile communication device 10 according to an embodiment of the invention.

FIG. 2 is a block diagram illustrating the mobile communication device 10 according to an embodiment of the invention. The mobile communication device 10 comprises a wireless module 110 and a controller module 120. The wireless module 110 is responsible for performing the functionality of wireless transmission and reception to and from the service network 20. The controller module 120 is responsible for controlling the operations of the wireless module 110 for communication controls with the service network 20, and other functional components (not shown), such as a display unit and/or keypad serving as the Man-Machine Interface (MMI), a storage unit storing the program codes of applications or communication protocols, or others. Also, the controller module 120 controls the wireless module 110 for performing the method for monitoring the PDCCH when the mobile communication device 10 has an SPS C-RNTI.

To further clarify, the wireless module 110 may be a Radio Frequency (RF) unit (not shown), and the controller module 120 may be a general-purpose processor or a Micro Control Unit (MCU) of a baseband unit (not shown) (which may be called a baseband processor). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 2100 MHz, or 2.6 GHz utilized in LTE technology, or others depending on the wireless technology in use.

Similar to the mobile communication device 10, each cellular station in the cellular access network 210 may comprise a wireless module (not shown) and a controller module (not shown), wherein the wireless module is configured to perform the functionality of wireless transceiving for the service network 20 and the controller module is configured to control the operation of the wireless module.

Figure 3:
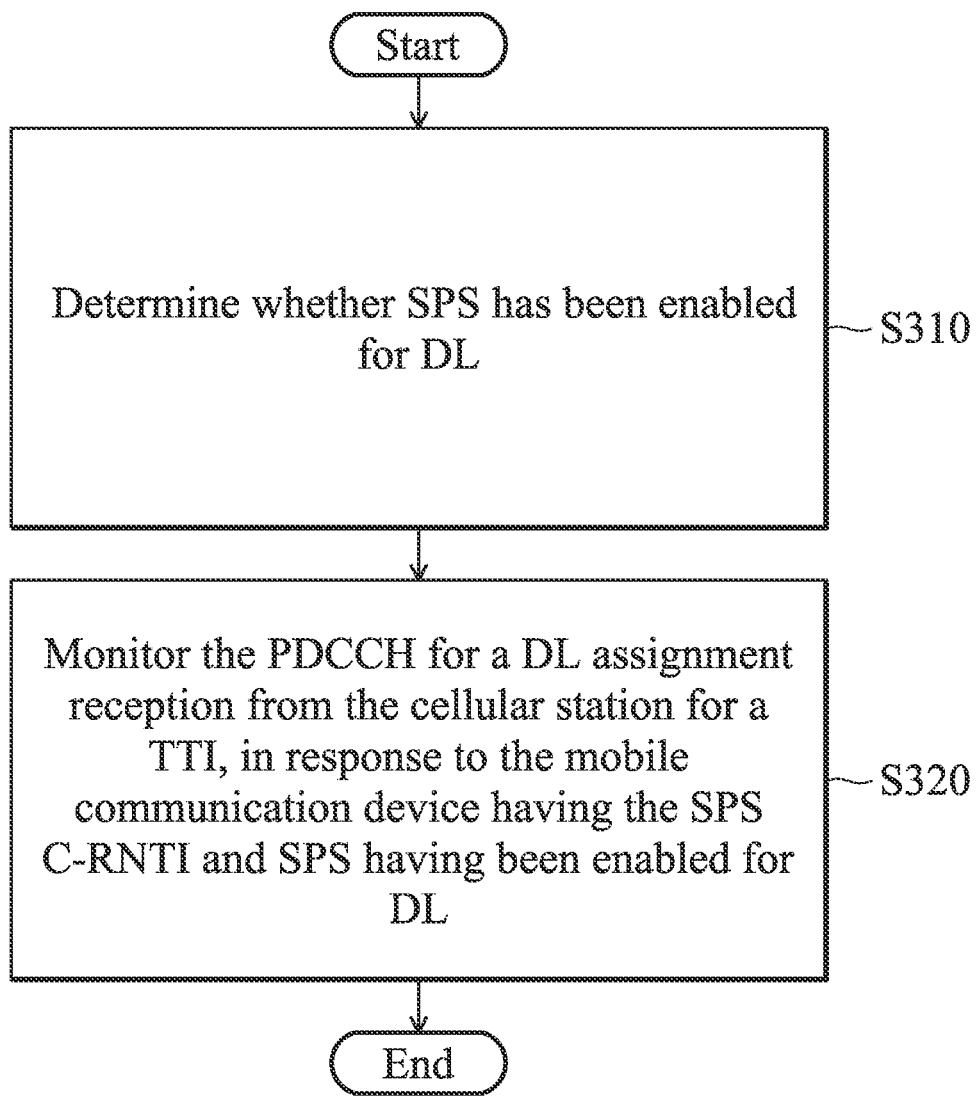
FIG. 3 is a flow chart illustrating the method for monitoring the PDCCH according to an embodiment of the invention.

FIG. 3 is a flow chart illustrating the method for monitoring the PDCCH according to an embodiment of the invention. In this embodiment, the method for monitoring the PDCCH is applied to a mobile communication device having an SPS C-RNTI configured by a cellular station. To begin, the mobile communication device determines whether SPS has been enabled for DL (step S310), and then monitors the PDCCH for a DL assignment reception from the cellular station for a TTI, in response to the mobile communication device having the SPS C-RNTI and SPS having been enabled for DL (step S320). In one embodiment, the monitoring of the PDCCH for the DL assignment reception from the cellular station may be performed for each serving cell, including Primary Cell (PCell) and Secondary Cell(s) (SCell(s)). In another embodiment, the monitoring of the PDCCH for the DL assignment reception from the cellular station may be performed for PCell only. Unlike the conventional UE, the mobile communication device of the invention checks to see if SPS has been enabled for DL before monitoring the PDCCH for a DL assignment reception, and only performs the PDCCH monitoring when SPS has been enabled for DL. That is, the mobile communication device does not monitor the PDCCH for the DL assignment reception from the cellular station for each TTI and each serving cell, in response to the mobile communication device having the SPS C-RNTI and SPS not having been enabled for DL. Thus, the mobile communication device of the invention advantageously avoids unnecessary PDCCH monitoring for a DL assignment reception when SPS has not been enabled for DL.

In one embodiment, the SPS for DL is enabled by the Radio Resource Control (RRC) layer of the communication protocol for the LTE technology, and steps S310 and S320 may be performed in compliance with the Media Access Control (MAC) layer of the communication protocol for the LTE technology.

Figure 4:
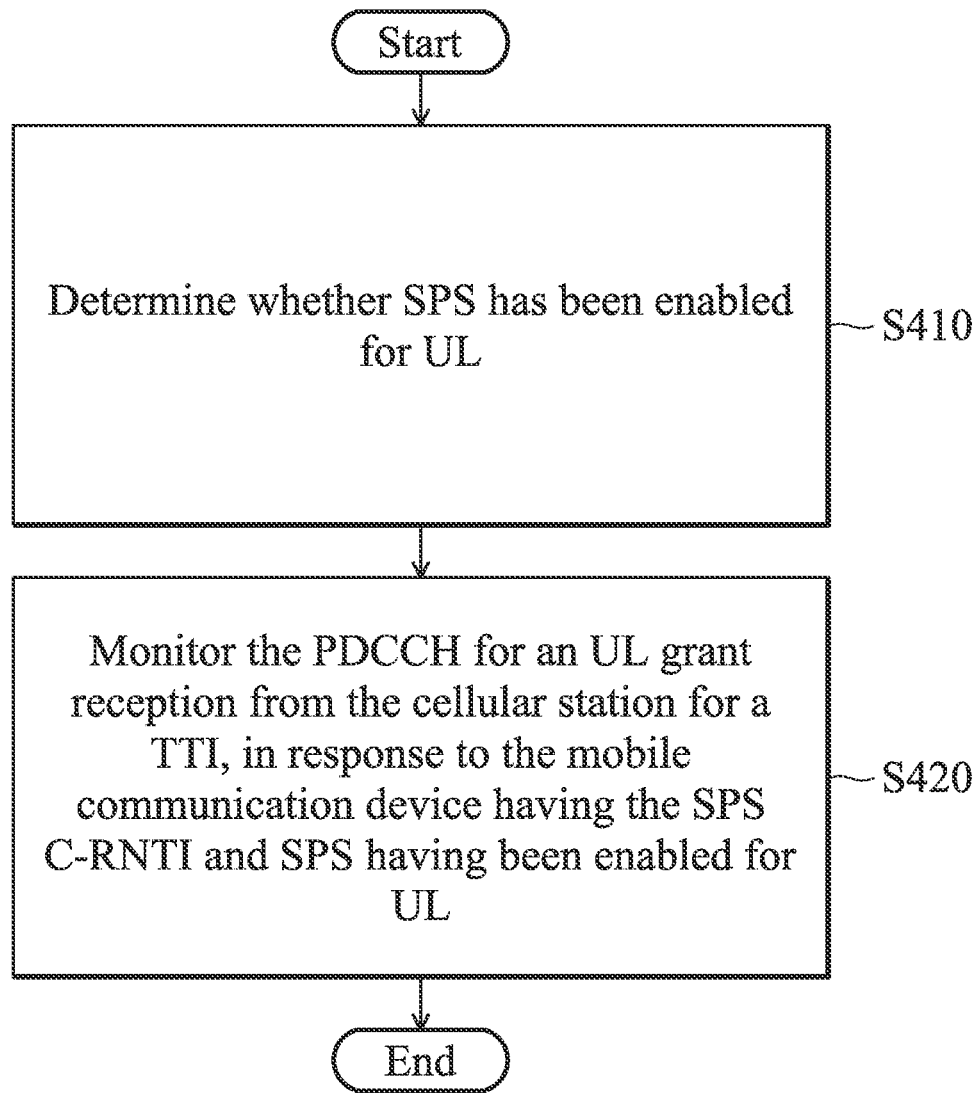
FIG. 4 is a flow chart illustrating the method for monitoring the PDCCH according to another embodiment of the invention.

FIG. 4 is a flow chart illustrating the method for monitoring the PDCCH according to another embodiment of the invention. In this embodiment, the method for monitoring the PDCCH is applied to a mobile communication device having an SPS C-RNTI configured by a cellular station. To begin, the mobile communication device determines whether SPS has been enabled for UL (step S410), and then monitors the PDCCH for a UL grant reception from the cellular station for a TTI, in response to the mobile communication device having the SPS C-RNTI and SPS having been enabled for UL (step S420). In one embodiment, the monitoring of the PDCCH for the UL grant reception from the cellular station may be performed for each serving cell, including Primary Cell (PCell) and Secondary Cell(s) (SCell(s)). In another embodiment, the monitoring of the PDCCH for the UL grant reception from the cellular station may be performed for PCell only. Unlike the conventional UE, the mobile communication device of the invention checks to see if SPS has been enabled for UL before monitoring the PDCCH for an UL grant reception, and only performs the PDCCH monitoring when SPS has been enabled for UL. That is, the mobile communication device does not monitor the PDCCH for the UL grant reception from the cellular station for each TTI and each serving cell, in response to the mobile communication device having the SPS C-RNTI and SPS not having been enabled for UL. Thus, the mobile communication device of the invention advantageously avoids unnecessary PDCCH monitoring for an UL grant reception when SPS has not been enabled for UL.

In one embodiment, the SPS for UL is enabled by the RRC layer of the communication protocol for the LTE technology, and steps S410 and S420 may be performed in compliance with the MAC layer of the communication protocol for the LTE technology.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the invention shall be defined and protected by the following claims and their equivalents.

What is claimed is:

1. A mobile communication device, having a Semi-Persistent Scheduling (SPS) Cell Radio Network Temporary Identifier (C-RNTI), comprising:
a wireless module performing wireless transmission and reception to and from a cellular station; and
a controller module performing operations for communication controls, wherein the operations comprise: determining whether SPS has been enabled for downlink (DL), instructing the wireless module to monitor a Physical Downlink Control Channel (PDCCH) for a DL assignment reception from the cellular station for a Transmission Time Interval (TTI), in response to the mobile communication device having the SPS C-RNTI and SPS having been enabled for DL, and instructing the wireless module not to monitor the PDCCH for the DL assignment reception from the cellular station for the TTI, in response to the mobile communication device having the SPS C-RNTI and SPS not having been enabled for DL.

2. The mobile communication device of claim 1, wherein the monitoring of the PDCCH for the DL assignment reception from the cellular station may be performed for a Primary Cell (PCell) only.

3. The mobile communication device of claim 1, wherein the operations are performed in compliance with a Media Access Control (MAC) layer of a communication protocol for a Long Term Evolution (LTE) technology.

4. The mobile communication device of claim 1, wherein the SPS for DL is enabled by a Radio Resource Control (RRC) layer of a communication protocol for a Long Term Evolution (LTE) technology in use between the mobile communication device and the cellular station.

5. A method for monitoring a Physical Downlink Control Channel (PDCCH) by a mobile communication device having a Semi-Persistent Scheduling (SPS) Cell Radio Network Temporary Identifier (C-RNTI) configured by a cellular station, the method comprising:
determining whether SPS has been enabled for downlink (DL); and
monitoring the PDCCH for a DL assignment reception from the cellular station for a Transmission Time Interval (TTI), in response to the mobile communication device having the SPS C-RNTI and SPS having been enabled for DL;
not monitoring the PDCCH for the DL assignment reception from the cellular station for the TTI, in response to the mobile communication device having the SPS C-RNTI and SPS not having been enabled for DL.

6. The method of claim 5, wherein the monitoring of the PDCCH for the DL assignment reception from the cellular station may be performed for a Primary Cell (PCell) only.

7. The method of claim 5, wherein the determining step and the monitoring step are performed in compliance with a Media Access Control (MAC) layer of a communication protocol for a Long Term Evolution (LTE) technology.

8. The method of claim 5, wherein the SPS for DL is enabled by a Radio Resource Control (RRC) layer of a communication protocol for a Long Term Evolution (LTE) technology in use between the mobile communication device and the cellular station.

9. A mobile communication device, having a Semi-Persistent Scheduling (SPS) Cell Radio Network Temporary Identifier (C-RNTI), comprising:
a wireless module performing wireless transmission and reception to and from a cellular station; and
a controller module performing operations for communication controls, wherein the operations comprise: determining whether SPS has been enabled for uplink (UL), instructing the wireless module to monitor a Physical Downlink Control Channel (PDCCH) for an UL grant reception from the cellular station for a Transmission Time Interval (TTI), in response to the mobile communication device having the SPS C-RNTI and SPS having been enabled for UL, and instructing the wireless module not to monitor the PDCCH for the UL grant reception from the cellular station for the TTI, in response to the mobile communication device having the SPS C-RNTI and SPS not having been enabled for UL.

10. The mobile communication device of claim 9, wherein the monitoring of the PDCCH for the UL grant reception from the cellular station may be performed for a Primary Cell (PCell) only.

11. The mobile communication device of claim 9, wherein the operations are performed in compliance with a Media Access Control (MAC) layer of a communication protocol for a Long Term Evolution (LTE) technology.

12. The mobile communication device of claim 9, wherein the SPS for UL is enabled by a Radio Resource Control (RRC) layer of a communication protocol for a Long Term Evolution (LTE) technology in use between the mobile communication device and the cellular station.

13. A method for monitoring a Physical Downlink Control Channel (PDCCH) by a mobile communication device having a Semi-Persistent Scheduling (SPS) Cell Radio Network Temporary Identifier (C-RNTI) configured by a cellular station, the method comprising:
 determining whether SPS has been enabled for uplink (UL);
 monitoring the PDCCH for an UL grant reception from the cellular station for a Transmission Time Interval (TTI), in response to the mobile communication device having the SPS C-RNTI and SPS having been enabled for UL; and
 not monitoring the PDCCH for the UL grant reception from the cellular station for the TTI, in response to the mobile communication device having the SPS C-RNTI and SPS not having been enabled for UL.

14. The method of claim 13, wherein the monitoring of the PDCCH for the UL grant reception from the cellular station may be performed for a Primary Cell (PCell) only.

15. The method of claim 13, wherein the determining step and the monitoring step are performed in compliance with a Media Access Control (MAC) layer of a communication protocol for a Long Term Evolution (LTE) technology.

16. The method of claim 13, wherein the SPS for UL is enabled by a Radio Resource Control (RRC) layer of a communication protocol for a Long Term Evolution (LTE) technology in use between the mobile communication device and the cellular station.

* * * * *